March 28, 1967 E. I. LYNCH 3,311,701

VERTICAL SYNCHRONIZATION SYSTEM FOR USE IN A TELEVISION RECEIVER

Filed Oct. 30, 1963 2 Sheets-Sheet 1

INVENTOR:
EDWARD I. LYNCH,
BY Julius J. Zaskalicky
HIS ATTORNEY.

INVENTOR:
EDWARD I. LYNCH,
BY Julius J. Zaskalicky
HIS ATTORNEY.

United States Patent Office 3,311,701

Patented Mar. 28, 1967

3,311,701

VERTICAL SYNCHRONIZATION SYSTEM FOR USE IN A TELEVISION RECEIVER

Edward I. Lynch, Syracuse, N.Y., assignor to General Electric Company, a corporation of New York Filed Oct. 30, 1963, Ser. No. 320,072
8 Claims. (Cl. 178—69.5)

The present invention relates in general to synchronization circuits in television systems, and in particular relates to vertical synchronization circuits for use in a color television receiver.

In television receivers vertical synchronization is accomplished by integrating synchronizing pulses of the received television signal and utilizing the integrated vertical signal for triggering the vertical sweep generator of the receiver. Changes in shape, time of occurrence and amplitude of the integrated vertical pulses cause changes in time of initiation of successive vertical sweep waves. Such changes in initiation of the vertical sweep wave not only impair interlace of alternate fields of each frame but also proper superposition of successive frames. Such condition results in loss of picture resolution among other things.

To eliminate such conditions it has been proposed to add to the integrated vertical synchronizing pulses a series of continuously occurring pulses of twice the horizontal scanning frequency and setting the voltage level of initiation of vertical sweep such that initiation thereof occurs when the sum of the amplitudes of the integrated vertical pulses and one of the twice horizontal frequency pulses reaches or exceeds such level. With such an arrangement small changes in shape, amplitude and time of occurrence of the vertical synchronizing pulse are not likely alone to trigger the vertical sweep generator. However, even with such an arrangement the vertical sweep generator could be spuriously triggered with the adverse effects mentioned above.

Accordingly, an object of the present invention is to provide an improved vertical synchronization circuit for use in a television system.

Another object of the present invention is to provide a vertical synchronization system in which the time of occurrence of successive vertical sweep waves is precisely controlled and is independent of the shape, size and normal variations of time of occurrence of the integrated vertical synchronizing pulses of a television signal.

The present invention is carried out in one form by means of a free-running multivibrator, a source of twice horizontal scan frequency pulses and a gating circuit. The gating circuit is activated by the integrated vertical synchronizing pulses of the received television signal and selects from a train of pulses of twice horizontal frequency a pulse which synchronizes the free-running multivibrator. The free-running multivibrator actuates the vertical sweep generator.

The novel features believed characteristic of the invention are set forth in the appended claims. The invention itself, together with further objects and advantages thereof may best be understood by reference to the following description taken in connection with the accompanying drawings in which:

FIGURES 2 through 9 are graphical representations of the voltages occurring at various points in the circuit of FIGURE 1 as a function of time.

Figure 1:
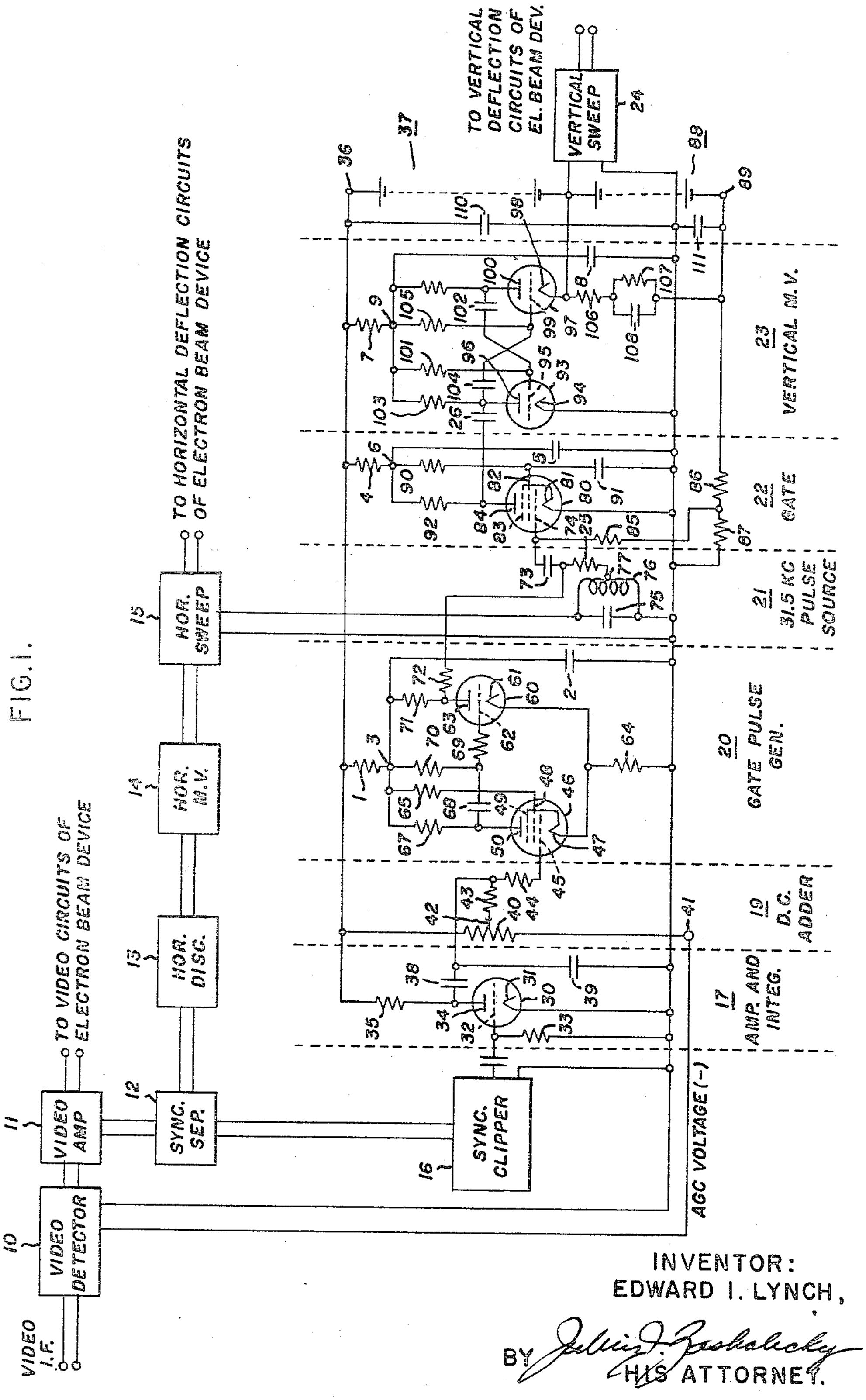
FIGURE 1 is a diagram partly in block from, and partly in schematic form of a portion of a television receiver.

Referring now to FIGURE 1 there is shown a video detector 10 and a video amplifier 11. The video detector functions to demodulate the output of the intermediate frequency channel of the television receiver. Such demodulated output includes video and horizontal and vertical synchronizilng signals, and is applied to the video amplifier. One output of the video amplifier 11 is then applied to the video circuits of the television receiver which functions to modulate the intensity of the scanning beam of the cathode ray tube or other image reproduction device. Another output of the video amplifier 11 is applied to the synchronizing signal separator 12 which functions to remove the horizontal and vertical synchronizing signals from the composite television signal. The horizontal synchronizing pulses are detected by a horizontal discriminator 13, the output of which then triggers or synchronizes a multivibrator or horizontal pulse generator 14. The output of the horizontal pulse generator 14 in turn drives the horizontal sweep circuits 15 of the television receiver. From the output of the synchronizing signal separator 12 the synchronizing signal is applied to the synchronizing signal clipper 16. The clipper 16 eliminates the amplitude above and below a certain reference level to provide a synchronizing signal of improved or more nearly idealized form. The resulting clipped or shaped waveform is then amplified and each of the amplified pulses is integrated by the amplifier and integrator 17.

Normally such integrated output would then be applied to the vertical sweep generator to trigger the latter whenever the amplitude of the integrated pulses reached a certain level of voltage. As changes in transmission and random noise in the signal will cause a change in the shape, amplitude and time of occurrence of the integrated vertical synchronizing pulse, the leading or lagging edge of the vertical multivibrator which corresponds to the time reference from which the vertical sweep initiates would vary in time position. Such variation would vary the time of initiation of the vertical sweep in the television receiver and cause the adverse effects pointed out above.

The portion of the receiver circuit shown in schematic form is directed to providing a vertical drive pulse and consequently vertical sweep voltages which are free of most such adverse effects. In accordance with the present invention the amplified and integrated vertical pulses are applied to a gate pulse generator 20 the leading edge of the output of which is variable in accordance with bias applied thereto by direct current adder 19, and in addition is automatically varied in accordance with the level of the detected video signal by automatic gain control voltage applied to the input of the gate pulse generator 20. Pulse generator 20 provides a pulse in which the rise time and amplitude are constant and only the position of the leading edge varies. The output of the gate pulse generator is applied to the gating device 22 in series with a train of pulses of 31.5 kilocycles or twice the horizontal scan frequency from source 21. Thus from the output of the gate 22 are obtained a series of twice horizontal frequency pulses occurring during the time of occurrence of the pulse developed by the gate pulse developed by the gate pulse generator 20. The duration of the pulse from the gate pulse generator 20 may be varied and is particularly set in a manner to be described hereinafter. The series of pulses from the gate 22 are then applied to the input of the vertical multivibrator 23 which may be a conventional free-run multivibrator. The output of such multivibrator is utilized to actuate the vertical sweep generator 24 of the television receiver. The vertical multivibrator 23 is a free-running multivibrator for the reason that in the absence of any synchronizing signal the vertical sweep continues thus avoiding damage to the image reproduction device resulting from the absence of movement of the electron beam thereof.

The number of 31.5 kilocycle pulses selected by the gate 22 is determined by the gate pulse generator 20. Such duration is set to pass several twice horizontal frequency pulses, for example of the order of six, although only one such pulse is needed. The duration of each of the pulses of the vertical multivibrator 23 is set to be longer than the duration of the pulses from the gate 20 to avoid spurious triggering of the vertical multivibrator and also the sweep generator by the twice horizontal frequency pulses. The free running frequency of multivibrator 23 is arranged to be less than the duration of each vertical sweep in order to assure proper occurrence of the initiation of vertical sweep, i.e., proper synchronization.

The amplifier and integrator 17 comprises an electron discharge device 30 having a cathode 31 connected to ground, a grid 32 connected through a grid resistor 33 to ground and through a coupling resistor to a synchronizing signal clipper and amplifier 16. The anode 34 is connected through an anode plate load resistor 35 to the positive terminal 36 of a source 37 of unidirectional operating potential. The anode 34 is also connected through a coupling capacitor 38 to one terminal of an integrating terminal capacitor 39, the other terminal of which is connected to ground. The D.C. adder 19 comprises a potentiometer 40 having one terminal connected to the positive terminal 36 of source 37 and the negative terminal connected to the negative automatic gain control point 41 on the video detector. The center tap 42 of the adder is connected through resistors 43 and 44 connected in series to the grid 45 of the input electron discharge device 46 of the gate pulse generator 20. The ungrounded side of the integrated capacitor 39 is connected to the junction of the resistors 43 and 44.

The gate pulse generator 20 comprises an electron discharge device including a cathode 47, a control grid 45, a screen electrode 48, a suppressor grid 49, and an anode 50 and another electronic discharge device 60 including a cathode 61, a grid 62 and an anode 63. The cathodes 47 and 60 are connected through a common cathode load resistor 64 to ground. The screen grid 48 is connected through a resistor 65 to point 3 which in turn is connected to point 36 through decoupling resistor 1 and to ground through decoupling capacitor 2. The suppressor grid 49 is connected to the cathode 47. The anode 50 is connected through an anode load resistor 67 to point 3. The anode 50 is also connected to the grid 62 of the electron discharge device through a coupling capacitor 68 and a series grid resistor 69. The junction point of the capacitor 68 and resistor 69 is connected through a resistor 70 to point 3. The anode 63 is connected through an anode load resistor 71 to point 3. The anode 63 is also connected through a series isolated resistor 72 and coupled capacitor 73 to the grid 74 of the gate 22.

The source 21 of 31.5 kilocycle pulses comprises a circuit including capacitor 75 and inductance 76 connected in parallel. The parallel resonant frequency of the circuit is set to be twice the horizontal frequency of the television receiver. A voltage from the horizontal sweep circuit 15, in particular the fly-back voltage, is applied across the parallel resonant circuit. A point 77 on the inductance 76 is tapped to provide the 31.5 kc. pulses of proper amplitude between that point and ground. A resistor 25 is connected between point 77 and the junction of resistance 72 and capacitance 73.

The gate comprises an electron device 80 including a cathode 81, a grid 74, a screen grid 82, a suppressor grid 83 and an anode 84. The cathode 81 is connected to ground. The grid 74 is connected through a grid resistor 85 to the junction point of resistors 86 and 87 forming a voltage divider connected across negative source 89, one terminal of which is negative and the other terminal grounded. The screen grid 82 is connected through a screen resistor 90 to the intermediate potential point 6 and is also connected through a bypass capacitor 91 to ground. The suppressor grid 83 is connected to cathode 81. The anode 84 is connected through an anode load resistor 92 to point 6. Point 6 is connected to positive terminal 36 through a decoupling resistor 4 and is also connected to ground through decoupling capacitor 5.

The vertical multivibrator 23 comprises an electron discharge device 93 including a cathode 94, a grid 95 and an anode 96, and another device 97 including a cathode 98, a grid 99 and an anode 100. The cathode 94 is connected to ground. The grid 95 is connected through a grid resistor point 9 and through coupling capacitor 102 to the anode 100. The anode 96 is connected through anode load resistor 103 to point 9. The anode 96 is also connected to the plate 84 of the gate 22 through coupling capacitor 26, and further is connected through capacitor 104 to the grid 99. The grid 99 is connected through grid resistance 105 to point 9. The cathode 98 is connected through a cathode load resistor 106 and a parallel circuit of resistance 107 and capacitance 108 for applying bias in series with the load resistance 106 to the negative terminal 89 of a source 88 of negative bias. The anode 100 is connected through an anode load resistance 109 to point 9. Point 9 is connected to positive terminal 36 through decoupling resistor 7 and is also connected through decoupling capacitor 8. Output from the multivibrator 23 is obtained between the cathode 98 and ground, or alternately may be obtained between anode 100 and ground. Such output is applied to the vertical sweep generator 24 of the television receiver. The sources 37 and 38 are by-passed for the horizontal and vertical sweep frequencies respectively by capacitors 110 and 111.

The operation of the circuit in accordance with the present invention will be explained in connection with the graphs of voltage shown in FIGURES 2A through 2H. Time is plotted along abscissa of each of the graphs to a common scale. Voltage is plotted along each ordinate to a scale which differs for each graph.

Figures 2A, 2B, 2C, 2D, 2E, 2F, 2G, 2H:
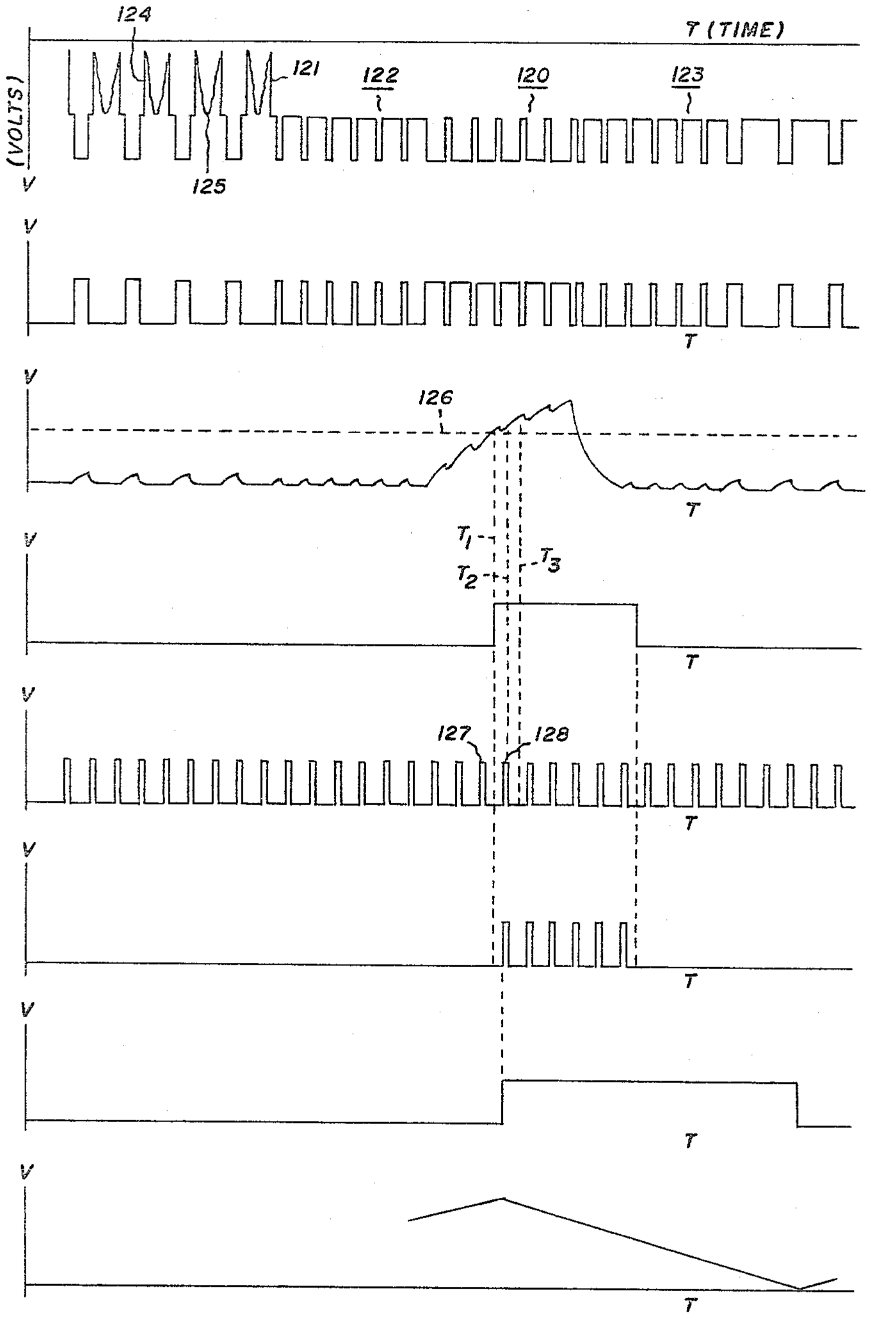

The waveform of FIGURE 2A shows a portion of the standard television signal occurring during and on each side of the vertical blanking interval for one field thereof taken at the output of the video detector. The serrated vertical synchronizing pulse 120 is situated in the vertical blanking pulse interval 121. Also situated in the interval 121 on each side of the serrated vertical synchonizing pulse are a series of six equalizing pulses 122 and 123. On either side of the vertical blanking interval in the spacing between the horizontal blanking pulses 124 are shown the video signals 125 which modulate the electron beam of a cathode ray tube of a television receiver.

The waveform of FIGURE 2B shows the train of synchronizing pulses after clipping by the sync clipper 16. Such pulses are integrated by the amplifier and integrator 17, the output of which, appearing across capacitor 39 has the form shown in FIGURE 2C.

The output of the integrator 17, biasing voltage from the direct current adder 19, and automatic gain control voltage at point 41 is applied to the grid of the gate pulse generator 20 to trigger the gate pulse generator into operation at a voltage value 126 in the integrated vertical synchronizing signal determined by the setting of the direct current adder 19 and the automatic gain control voltage to cause the generator to develop a voltage pulse of the form shown in FIGURE 2D.

The gate pulse generator 20 is a conventional cathode coupled multivibrator of the one shot variety. The output of the gate pulse generator 20 shown in FIGURE 2D is applied to the grid of the gate 22 along with the train of twice horizontal frequency pulses shown in FIGURE 2E. The duration of the output of the gate pulse generator 20 is selected for reasons of convenience to embrace six or so of the twice horizontal frequency pulses. The grid of the gate 22 is biased to a very large negative voltage and consequently is normally non-conducting. The occurrence of either the pulse from gate pulse generator 20 or the twice horizontal frequency pulses from source 21 is insufficient in itself to raise the grid potential of gate 22 sufficiently to cause grid conduction in the gate. Only when both of the aforementioned signals are applied simultaneously does this condition occur and gate 22 produces an output such as shown in FIGURE 2F. The output of the gate 22 is applied to a conventional free-running multivibrator 23. The initial pulse of the series or group of twice horizontal frequency pulses triggers the multivibrator 23. The output of the multivibrator is shown in FIGURE 2G. The duration of the pulse of FIGURE 2G is set by value of the circuit elements of multivibrator 23 to correspond to the desired vertical retrace time. If an extremely short retrace is desired, the number of 3.15 kc. pulses allowed through gate 23 are reduced by reducing the duration of the gate pulse from generator 20. Failure to do this may cause the multivibrator 20 to either squegg or false fire. The output of multivibrator 23 is then applied to the vertical sweep generator 24 which initiates the vertical sweep voltage, such as shown in FIGURE 2H. The vertical sweep generator 24 may be of the kind in which the sawtooth deflection wave starts at the trailing or lagging edge of the vertical multivibrator 23. Under such circumstances the duration of the pulse of multivibrator 23 corresponds to the retrace interval of the sawtooth wave of the sweep generator 24. One form of sweep generator 24, such as described above, is described in patent application Ser. No. 318,539, filed Oct. 24, 1963, and assigned to the assignee of the present invention.

Under noise free conditions, the lead edge of the gating pulse of FIGURE 2D is set to occur half-way between adjacent twice horizontal frequency pulses 127 and 128. Under weak signal conditions variations in shape, amplitude, and the time of occurrence of the integrated vertical synchronizing pulse shown in FIGURE 2C cause the leading edge of FIGURE 2D to shift about such center position. Noise produced changes in the aforementioned characteristics of the integrated waveform of FIGURE 2C are not sufficient to cause the lead edge of the pulse of FIGURE 2D to jitter by more than the limits of plus or minus one-fourth of the horizontal scanning period. In addition to random fluctuation in the waveform of FIGURE 2C caused by noise, imperfect automatic gain control and limiting will cause the average amplitude of waveform of FIGURE 2C to decrease when weak signals are received. This will cause the intersection of voltage level 126 and pulse of FIGURE 2C to occur at a later point than time $T_1$, for example time $T_2$, or time $T_3$. At time $T_3$ no adverse effects would result; however, at time $T_2$, pulse 128 will randomly pass through the gate 22 and interlace will be lost. To prevent this, automatic gain control voltage is added at point 41 to the gate pulse generator 20. The average time of occurrence of the leading edge of pulse of FIGURE 2D under noisy signal conditions will now also occur half way between pulses 127 and 128. Also, the operating conditions of gate 22 are set to avoid any possible vestige of integrated vertical synchronizing pulse information from passing therethrough to spuriously trigger multivibrator 23. Accordingly, the initial pulse of the group of six pulses of FIGURE 2F, which is the pulse that initiates the vertical multivibrator, occurs at precisely timed intervals accurately timing the initiation of sweep of the receiver thus avoiding the adverse effects mentioned above. Theoretically a single such pulse would be adequate, however, such an arrangement would be operating the system to quite close tolerances, and furthermore gating pulse generators are more conventiently arranged when the "on" and "off" periods thereof are not too widely different in time extent. Conveniently, the duration of the gating pulses has been made to embrace six twice horizontal frequency pulses. This number could be more or less. Also, the number of pulses should not be so large that the last one of such pulses occurs in the vicinity of the trailing edge of the pulse from the vertical multivibrator, as such would interfere with the proper initiation of vertical sweep. Thus, a vertical sweep synchronization circuit has been provided which has the noise immunity of the horizontal sweep automatic frequency control circuit up to the point where variations in integrated vertical synchronizing pulses exceed plus or minus one-fourth of the period of the horizontal synchronizing pulses.

While the invention has been described in specific embodiments, it will be appreciated that many modifications may be made by those skilled in the art, and I intend by the appended claims to cover all such modifications and changes as fall within the true spirit and scope of the invention.

What I claim as new and desire to secure by Letters Patent of the United States is:

1. In a television system, means for deriving from a received television signal a series of integrated vertical synchronizing pulses, means responsive to a predetermined amplitude level of said integrated pulses to produce another series of pulses, each pulse in said other series corresponding to a respective pulse in said one series, a source of short pulses having a repetition rate of an integral multiple of the horizontal scanning frequency of the television system, means responsive to said other series of pulses for deriving from said source of short pulses groups of such short pulses, each group occurring during the occurrence of a respective one of said other series of pulses, and means for developing a third series of pulses each responsive to the first one of a respective group of short pulses.

2. In a television system, means for deriving from a received television signal a series of integrated vertical synchronizing pulses, means responsive to a predetermined amplitude level of said integrated pulses to produce another series of pulses, each pulse in said other series corresponding to a respective pulse in said one series, a source of short pulses having a repetition rate of an integral multiple of the horizontal scanning frequency of the television system, means responsive to said other series of pulses for deriving from said source of said short pulses a short pulse occurring during the occurrence of a respective one of the pulses of said other series of pulses, means for developing a third series of pulses each responsive to a respective one of said short pulses.

3. In a television system, means for deriving from a received television signal a series of integrated vertical synchronizing pulses, means responsive to a predetermined amplitude level of said integrated pulses to produce another series of pulses, each pulse in said other series corresponding to a respective pulse in said one series, a source of short pulses having a repetition rate of twice the horizontal scanning frequency of the television system, means responsive to said other series of pulses for deriving from said source of short pulses groups of such short pulses, each group having at least one pulse occurring during the occurrence of a respective one of said other series of pulses, means for developing third series of pulses, each pulse of which is responsive to a respective one of the pulses in a respective group of short pulses, and means responsive to pulses of said third series of pulses for initiating vertical scanning in said system.

4. In a television system, means for deriving from a received television signal a series of integrated vertical synchronizing pulses, means responsive to a predetermined amplitude level of said integrated pulses to produce another series of pulses, each pulse in said other series corresponding to a respective pulse in said one series, a source of short pulses having a repetition rate of twice the horizontal scanning frequency of the television system, means responsive to said other series of pulses for deriving from said source of short pulses groups of such short pulses, each group having several pulses and occurring during the occurrence of a respective one of said other series of pulses, means for adjusting the time of occurrence of the leading edge of the pulses of said other series to occur on average at an instant midway between the occurrence of successive short pulses, means for developing a third series of pulses each in response to a respective pulse in a respective group of pulses, and means responsive to each pulse in said third series of pulses for initiating vertical scan in said system.

5. In a television system, means for deriving from a received television signal a series of integrated vertical synchronizing pulses, means responsive to a predetermined amplitude level of said integrated pulses to produce another series of pulses, each pulse in said other series corresponding to a respective pulse in said one series, a source of short pulses having a repetition rate of an integral multiple of the horizontal scanning frequency of the television system, means responsive to said other series of pulses for deriving from said source of short pulses groups of such short pulses, each group occurring during the occurrence of a respective one of said other series of pulses, means for developing a third series of pulses each in response to a first one of a respective group of said short pulses and each having a lagging edge occurring subsequent to the occurrence of the lagging edge of a corresponding pulse of said other series, and means responsive to each pulse of said other series for initiating vertical scanning in said system.

6. In a television system, means for deriving from a received television signal a series of integrated vertical synchronizing pulses, means responsive to a predetermined amplitude level of said integrated pulses to produce another series of pulses, each pulse in said other series corresponding to a respective pulse in said one series, a source of short pulses having a repetition rate of an integral multiple of the horizontal scanning frequency of the television system, means responsive to said other series of pulses for deriving from said source of short pulses groups of such short pulses, each group occurring during the occurrence of a respective one of the pulses of said other series of pulses, and means for developing a third series of pulses each responsive to the first one of a respective group of short pulses and each having a lagging edge occurring subsequent to the occurrence of the lagging edge of a corresponding pulse of said other series of pulses, the short pulses in each group of pulses occurring within the time occurrence of a respective pulse of said other series, and means responsive to said third series of pulses for initiating vertical scanning in said system.

7. In a television system, a multivibrator responsive to the level of voltage of integrated vertical synchronizing pulses for developing a series of pulses each having a leading edge in time correspondence with the level of a respective integrated vertical synchronizing pulse, means for varying the initiation of the leading edge of said pulses including a source of voltage in series with said integrated pulses, a source of short pulses having a repetition rate of twice the horizontal scanning frequency of the television system, means responsive to said series of pulses for deriving from said source of short pulses groups of such short pulses, each group having several pulses and occurring during the occurrence of a respective one of the pulses of said series of pulses, means for developing another series of pulses, each in response to the first one of a respective group of said short pulses, and means responsive to each pulse of said other series for initiating vertical scanning in said system.

8. In a television system, a multivibrator responsive to the level of voltage of integrated vertical synchronizing pulses for developing a series of pulses each having a leading edge in time correspondence with the level of a respective integrated vertical synchronizing pulse, means for varying the initiation of the leading edge of said pulses including a source of voltage in series with said integrated pulses, means for advancing in time said leading edge in accordance with the change in voltage level of the automatic gain control bias voltage of the television system, a source of short pulses having a repetition rate of twice the horizontal scanning frequency of the television system, means responsive to said series of pulses for deriving from said source of short pulses groups of such short pulses, each group having several pulses and occurring during the occurrence of a respective one of the pulses of said series of pulses, means for developing another series of pulses, each in response to the first one of a respective group of said short pulses, and means responsive to each pulse of said other series for initiating vertical scanning in said system.

References Cited by the Examiner

UNITED STATES PATENTS

| | | | |
|---|---|---|---|
| 2,497,413 | 2/1950 | Lindley | 178—69.5 |
| 3,217,102 | 5/1965 | Dome | 178—69.5 |
| 3,184,547 | 5/1965 | Dome | 178—69.5 |

OTHER REFERENCES

Fink: "Television Engineering Handbook," McGraw-Hill, New York, 1957, TK 6642 F5, pp. 16–165 through 16–175.

DAVID G. REDINBAUGH, *Primary Examiner.*

R. L. RICHARDSON, J. McHUGH, *Assistant Examiners.*